UNITED STATES PATENT OFFICE 2,437,343

PREPARATION OF IMPROVED DRYING OILS

Edward S. Barnitz, Rochester, N. Y., assignor to Distillation Products, Inc., Rochester, N. Y., a corporation of Delaware No Drawing. Application November 9, 1943, Serial No. 509,625

5 Claims. (Cl. 260—407)

This invention relates to improved procedure for the preparation of drying oils.

It is known that improved drying oils can be obtained by high vacuum unobstructed path distillation of a bodied drying oil. This is disclosed in Oosterhof Patent 2,065,728. This procedure results in the removal of the unpolymerizable material as distillate. The polymerized constituents of the oil remain undistilled and are substantially improved in drying time. It is also known that medicinal distillates of drying oils can be obtained by high vacuum unobstructed path distillation of such oils. This is disclosed in Hickman Patent 2,126,466.

This invention has for its object to provide improved procedure for preparing drying oils by procedure including vacuum distillation methods. Another object is to provide vacuum distillation procedure which will yield better drying oil products. Another object is to improve the state of the art. Other objects will appear hereinafter.

These and other objects are accomplished by my invention which includes subjecting an oil containing unsaturated and polymerizable constituents to a treatment for separating a portion of the oil having non-drying properties and to leave a residue, subjecting this residue to a bodying or polymerization treatment subjecting this bodied residue to high vacuum unobstructed path distillation, separating a fraction containing unpolymerized constituents and removing the undistilled residue from the still. This residue comprises an improved drying oil having markedly improved properties.

In the following description I have given several of the preferred embodiments of my invention but it is to be understood that they are set forth for the purpose of illustration and not in limitation thereof.

My invention is applicable to oils which contain constituents which are polymerizable and which have drying properties. As a commercial matter, the invention is not of interest in connection with oils having very minor amounts of such constituents and I prefer to apply the invention to drying oils having an iodine number of at least about 120. The invention is of particular value in connection with fish oils since these oils are available in large quantities and are cheap. They are less suitable as drying oils in their original condition but they do contain a substantial amount of drying constituents which, if suitably separated and treated, result in a drying oil of very high quality. Examples of suitable oils to which my invention can be applied are sardine, menhaden, soybean and linseed oils.

High vacuum unobstructed path distillation is well known in the art. It involves distillation under high vacuum and with vaporizing and condensing surfaces separated by substantially unobstructed space. When the distance between these surfaces is less than the mean free path, the distillation is known as molecular distillation. While molecular distillation is quite satisfactory, it need not be used for the purposes of my invention.

The preliminary treatment separates constituents of the oil which have no useful properties and in many cases have harmful effects. The preliminary step removes a substantial portion of the volatiles contained in the oil, non-polymerizable materials and also substances which appear to inhibit polymerization. While high vacuum unobstructed path distillation is preferred other procedures for separation of such materials such as solvent extraction can be used. The degree of removal in the preliminary distillation step varies depending upon the nature and origin of the oil. Thus, if a large proportion of sterols, non-polymerizable constituents, polymerization inhibitors, etc. is present a large portion would be removed. For practically all oils, a portion between 2 and 90% would be removed in the preliminary distillation or removal step. The higher percentage removal would be most useful for fish oils. In most cases I prefer to remove about 20% to 50%. With oils such as linseed or soy bean etc. the preliminary removal is preferably about 5% to 20%. Such oils are not usually further improved by removal of large amounts as is the case with fish oils. The distillation in the final step, i. e., subsequent to bodying, is preferably carried to the point where substantially all of the unpolymerized material is removed. However, this depends on the properties desired in the end product. However, the distilland is a bodied oil which, as is well known, is quite viscous. It, therefore, involves certain problems of heat transfer, and the degree of removal is preferably not carried to a point where the distilland becomes so viscous that it is deposited on the vaporizing surface in the form of a resin or other solid material. While I prefer to remove most of the unpolymerized material, it is to be understood that my invention results in a marked improvement even if a substantial portion of the non-polymerized is left in the undistilled residue and I include within its scope the removal of 2 to 100% of the nonpolymerized material in the final distillation step. It will generally be found that removal of 50% to 95% of the unpolymerized will be most satisfactory especially from an operational and commercial standpoint.

In the following examples I have illustrated the improved results obtained by my invention. In these examples references are made to drying time, hardness, etc. of the oil film. Drying time of the oil is determined by casting a film of 0.001" thickness on a smooth surface and allowing it to dry at 25° C., 50% relative humidity. When drawing the finger across the surface of the film shows no effect, the film is considered dry. Hardness is obtained with the Sward rocker by the methods outlined in the ninth edition of Gardiner's "Physical and Chemical Examination of Paints, Varnishes, Lacquers, Colors." Adhesion (a relative value) is determined by a knife-scraping method. Water resistance consists of immersing a 48-hour-old film in distilled water and inspecting it at various intervals for changes that appear.

*Example 1.*—Refined sardine oil was treated in the following manner: (a) The oil was polymerized by heating at 280° C. in an atmosphere of nitrogen to 10 poises (at 25° C.). It was then distilled by high-vacuum unobstructed-path distillation with the successive removal of a 20%, 15% and 15% distillate. This resulted in 80%, 65% and 50% residues, respectively. (b) The oil was stripped of 20% distillate containing the vitamins, sterols, etc., by high-vacuum unobstructed-path distillation and the resulting 80% residue was polymerized by heating in an atmosphere of nitrogen and at 280° C. to the same viscosity as the residue obtained by distilling 20% in a similar manner from above oil (a). The resulting polymerized product was further distilled in the same manner to give a 65% and a 50% residue. (c) The oil was distilled by high-vacuum unobstructed-path distillation in its unpolymerized form to both 65% and 50% residues. These in turn were polymerized in the same manner to the same viscosity as the stripped, bodied and distilled 65% and 50% residues described in example (b).

The drying characteristics of the above oils to which 0.2% lead and 0.02% cobalt have been added in the form of the naphthenate drier, are compared as follows:

| Treatment of Oil | Per Cent of Original Oil | Hours to Dry | Hardness | Adhesion | Water Resistance: Hours to blush |
|---|---|---|---|---|---|
| a. Polymerized and distilled | 65 | 4 | 4 | 3 | 4. |
| a. Polymerized and distilled | 50 | 3 | 6 | 7 | 6. |
| b. Stripped, polymerized and distilled | 65 | 4 | 6 | 6 | 8. |
| b. Stripped, polymerized and distilled | 50 | 2 | 8 | 16 | Does not blush, slight haze at 24 hrs. |
| c. Distilled and polymerized | 65 | 4 | 3 | 4 | 1. |
| c. Distilled and polymerized | 50 | 4 | 4 | 6 | ½. |

It will be noted from the foregoing example that the invention yields a product having somewhat decreased drying time and a marked increase in hardness, adhesion and resistance to water.

*Example 2.*—Alkali-refined, light-pressed and bleached sardine oil was stripped at 21% distillate containing vitamins, sterols, etc., by high-vacuum unobstructed-path distillation and the resulting undistilled portion oxidized by blowing with finely dispersed air at 140° C. until a viscosity of 19 poises absolute at 25° C. was reached. This polymerized oil was then distilled by the same technique until a 69% residue (based on the original oil) was obtained having a viscosity of 45 poises absolute at 25° C. By this procedure, a sardine oil that never completely dried hard was converted into a product that dried in two hours to a good hard film.

*Example 3.*—A 9.8% fraction containing vitamins, sterols, etc. was removed from alkali-refined, wintered and bleached linseed oil by high-vacuum unobstructed-path distillation. The undistilled portion was heat-polymerized at 300° C. under inert gas to 22.7 poises absolute at 25° C. and then further distilled using the same technique to (1) a 70% residue and (2) a 61% residue based on the original oil. The viscosities of these respective distilled portions were 78.4 and 98.5 poises absolute at 25° C. Where the original oil took 24 hours to dry to a relatively hard film, the residues dried in 4 hours with corresponding improved film hardness, water resistance, etc.

*Example 4.*—A 6.4% cut containing vitamins, sterols, etc. was distilled from an alkali-refined and bleached soybean oil by high-vacuum unobstructed-path distillation. The residue was treated in each of the following ways:

A. Heat-polymerized at 320° C. in an inert atmosphere to 11 poises, then oxidized at 140° C. to 20 poises absolute at 25° C.

B. Oxidized at 150° C. to 11 poises, then heat-polymerized at 175° C. in an inert atmosphere to 18 poises absolute at 25° C.

The above oil A was distilled to a 78% residue and oil B to 76.5% residue respectively, based on the original oil. These had 55- and 32-poise absolute at 25° C. viscosities and were improvements over the original oil with respect to their drying oil properties.

*Example 5.*—A 40% portion was removed from refined soybean oil by methanol extraction at 25° C. This was polymerized by heating. The nonpolymerizable portion was then removed by high vacuum, unobstructed-path distillation resulting in an oil having improved drying properties.

What I claim is:

1. The process of preparing an improved drying oil which comprises in combination, subjecting the oil which contains polymerizable constituents to a treatment for removal of at least part of the nonpolymerizable constituents, subjecting the remaining portion of the oil to a bodying treatment, subjecting the bodied oil to high vacuum unobstructed path distillation and separating a substantial portion of unpolymerized oil as a distillate.

2. The process of preparing an improved drying oil which comprises in combination, subjecting the oil which contains polymerizable constituents to high vacuum unobstructed path distillation, separating a fraction of the oil as distillate, subjecting the undistilled residue to a bodying treatment, subjecting the bodied oil to high vacuum unobstructed path distillation and separating a substantial portion of unpolymerized oil as a distillate.

3. The process of preparing an improved drying oil which comprises in combination subjecting an oil having an iodine number above about 120 to high vacuum unobstructed path distillation, separating a fraction of the oil, subjecting the undistilled residue to a bodying treatment, subjecting the bodied oil to high vacuum unobstructed path distillation and separating a substantial portion of the unpolymerized constituents of the oil as a distillate.

4. The process of preparing an improved drying oil which comprises in combination subjecting a fish oil having an iodine number above about 120 to high vacuum unobstructed path distillation, separating a fraction of the fish oil as distillate, subjecting the undistilled residue of the fish oil to a bodying treatment, subjecting the bodied oil to high vacuum unobstructed path distillation and separating a substantial portion of the unpolymerized constituents of the oil as distillate.

5. The process of preparing an improved drying oil which comprises in combination subjecting an oil having an iodine number above about 120 to high vacuum unobstructed distillation, separating between 20 and 50% of the oil as distillate, subjecting the undistilled residue to a bodying treatment, subjecting the bodied oil to high vacuum unobstructed path distillation and separating between 50 and 95% of the unpolymerized constituents of the oil as a distillate.

EDWARD S. BARNITZ.

REFERENCES CITED

The following references are of record in the file of this patent:

UNITED STATES PATENTS

| Number | Name | Date |
|---|---|---|
| 2,065,728 | Oosterhof | Dec. 29, 1936 |
| 2,126,466 | Hickman | Aug. 9, 1938 |
| 2,128,354 | Fawcett | Aug. 30, 1938 |
| 2,166,103 | Behr | July 18, 1939 |
| 2,308,020 | Morse | Jan. 12, 1943 |
| 2,311,681 | Morse | Feb. 23, 1943 |
| 2,366,525 | Harvey | Jan. 2, 1945 |
| 2,366,526 | Schaufelberger | Jan. 2, 1945 |
| 2,367,666 | Carleton | Jan. 23, 1945 |